US012750181B2

(12) United States Patent
Hassan et al.

(10) Patent No.: US 12,750,181 B2
(45) Date of Patent: Sep. 29, 2026

(54) SIDELINK POSITIONING IN UNLICENSED BAND

(71) Applicant: Robert Bosch GmbH, Stuttgart (DE)

(72) Inventors: Khaled Shawky Hassan, Sarstedt (DE); Maximilian Stark, Hamburg (DE)

(73) Assignee: Robert Bosch GmbH, Stuttgart (DE)

(*) Notice: Subject to any disclaimer, the term of this patent is extended or adjusted under 35 U.S.C. 154(b) by 252 days.

(21) Appl. No.: 18/726,219

(22) PCT Filed: Feb. 2, 2022

(86) PCT No.: PCT/EP2022/052418
§ 371 (c)(1),
(2) Date: Jul. 2, 2024

(87) PCT Pub. No.: WO2023/147849
PCT Pub. Date: Aug. 10, 2023

(65) Prior Publication Data

US 2025/0226941 A1 Jul. 10, 2025

(51) Int. Cl.
*H04W 4/38* (2018.01)
*H04L 5/00* (2006.01)
(Continued)

(52) U.S. Cl.
CPC ........... *H04L 5/0048* (2013.01); *H04W 64/00* (2013.01); *H04W 74/0808* (2013.01); *H04W 92/18* (2013.01)

(58) Field of Classification Search
CPC .... H04L 5/0048; H04L 5/0094; H04W 64/00; H04W 74/0808; H04W 92/18; H04W 16/14; H04W 76/14
(Continued)

(56) References Cited

U.S. PATENT DOCUMENTS

| | | | | |
|---|---|---|---|---|
| 11,506,746 | B1 * | 11/2022 | Vassilovski | H04W 72/20 |
| 2022/0074583 | A1 | 3/2022 | Huang et al. | |
| 2022/0131670 | A1 * | 4/2022 | Seo | H04L 5/0053 |

FOREIGN PATENT DOCUMENTS

| | | | | |
|---|---|---|---|---|
| WO | 2021044820 A1 | | 3/2021 | |
| WO | WO-2021057175 A1 | * | 4/2021 | H04W 72/20 |

(Continued)

OTHER PUBLICATIONS

International Search Report for PCT/EP2022/052418, Issued Sep. 2, 2022.

*Primary Examiner* — Tanmay K Shah
(74) *Attorney, Agent, or Firm* — Norton Rose Fulbright US LLP

(57) ABSTRACT

A method of a first radio node. The method includes: transmitting, from the first radio node, sidelink position reference signal configuration defining at least one position reference signal to be transmitted from a first radio node to the second radio node; generating at least one position reference signal as defined by the SPRS configuration transmitted to the second radio node; performing channel contention for the purpose of position reference signal transmission in a bandwidth range at least partially included in an unlicensed radio band, wherein the contention is performed using a listen before talk mechanism; based on a positive result of the channel contention, accessing the channel for the duration of a channel on time; and transmitting the at least one position reference signal to the second radio node during the channel on time.

17 Claims, 12 Drawing Sheets

(51) Int. Cl.
*H04W 64/00* (2009.01)
*H04W 74/0808* (2024.01)
*H04W 92/18* (2009.01)

(58) Field of Classification Search
USPC .......................................................... 455/456.2
See application file for complete search history.

(56) References Cited

FOREIGN PATENT DOCUMENTS

| | | | | | |
|---|---|---|---|---|---|
| WO | WO-2021057232 | A1 | * | 4/2021 | .............. H04W 4/44 |
| WO | 2022005727 | A1 | | 1/2022 | |
| WO | 2023049552 | A1 | | 3/2023 | |

* cited by examiner

SIDELINK POSITIONING IN UNLICENSED BAND

FIELD

The present invention a method of a first radio node for sidelink positioning using an unlicensed band, and an associated method of a second radio node, and associated devices, systems, computer program elements, and non-transitory computer readable media.

BACKGROUND INFORMATION

Connected mobility is the subject of a variety of communication standards such as IEEE 802.11p/bd and 3GPP LTE/NR V2X (shortened in this specification to "V2X"). Two scenarios are considered for V2X—that User Equipment (UE) can be within communication range of a base station (BS) such as an evolved-Node BS (eNB) or a 5G-NR-Node BS (gNB), or out of communication range. Another scenario is that a proportion of the UEs that are connected together may be connected to the network, and the remainder of the UEs that are connected together may be out of network coverage. This is referred to as partial out of coverage.

Typically, when a UE (for example, UE mounted in a vehicle) is in coverage, the UE can be configured to perform sidelink communication with other UEs in range. In this case, resource allocation, data control, and communication procedures are controlled by the UE. In the case that a UE is out of coverage of, for example, EUTRA or 5G-NR cells, the UE is pre-configured with mandatory configuration for autonomous communication using the sidelink. In example, a UE can be pre-configured with a number of out-of-coverage frequencies. As an example, the out-of-coverage frequencies may include the Intelligent Transport System (ITS) frequencies.

FIG. 1 schematically illustrates an example of a radio network 8. In this example, the network comprises a "V2X" configured sidelink utilizing mode 1 and mode 2, although it will be appreciated that the scenario of FIG. 1 may be extended to other radio standards using a sidelink between radio nodes that are out of coverage.

Region 10 is outside of network coverage provided by a BS. Region 12 is a region of partial coverage. Region 14 is in coverage. UE1 is a radio node that communicates with UE2 via a sidelink channel in mode 2, for example. UE3 communicates from the region of partial coverage to an out-of-coverage UE4 via the sidelink channel in Mode 2. UE5 communicates with UE6 via a sidelink channel in mode 1, as configured by control information Uu from the BS.

Identifying the position of a radio node with respect to another radio node is of interest in many scenarios. Wireless standards such as 3GPP Release 16 enable the UE to be configured with a downlink Position Reference Signal (PRS) having a high resource element (RE) density that is suitable for positioning calculations. The patterns of the PRS are referred to as combs, and are typically defined by the distance between two PRS REs, and an offset over time. Positioning approaches in 3GPP mobility scenarios may, however, be further improved.

SUMMARY

According to a first aspect of the present invention, there is provided a method of a first radio node. According to an example embodiment of the present invention, the method includes:

- transmitting, from the first radio node, a sidelink position reference signal configuration defining at least one position reference signal to be transmitted from a first radio node to the second radio node;
- generating at least one position reference signal as defined by the SPRS configuration transmitted to the second radio node;
- performing channel contention for the purpose of position reference signal transmission in a bandwidth range at least partially comprised in an unlicensed radio band, wherein the contention is performed using a listen before talk mechanism;
- based on a positive result of the channel contention, accessing the channel for the duration of a channel on time; and
- transmitting the at least one position reference signal to the second radio node during the channel on time.

An effect is that positioning may be performed over a side link by transmitting side link position reference signals in unlicensed carrier bands. This leads to an improved position resolution because a side link position reference signal comb can be detected and decoded with improved position resolution if it covers a wider bandwidth. The application of channel sensing enables the improved position resolution to be achieved without interference with higher priority users of the unlicensed bands. This enables the many regulatory requirements required to access the unlicensed spectrum to be preserved (such as a nominal bandwidth, and contiguous nominal carrier aggregation by the same device). The technique detailed herein is flexible, and can be applied to different nominal bandwidths and different nominal aggregate bands as specified between different regions. For example, the ETSI BRAN regulations mandate a nominal frequency of 20 MHz and 4, 8, 16 etc aggregated bands in the 5 GHZ and 6 GHz frequency bands, although the technique discussed herein may be generalised to other regions.

In other words, the first problem addressed is that cycling is limited to dedicated (ITS) and licensed bands. In this case, unlicensed bands can be used to complement the ITS/licensed bands.

The second problem is that it is difficult to guarantee wideband carriers for side link positioning simultaneously with communication carriers. In this case, unlicensed wideband operation can be used to increase the available bandwidth important for enhancing the positioning accuracy.

The third problem is that of initiating a channel on time (COT), and sharing a channel on time (COT). According to this specification, if a side link position reference signal (SPRS) is scheduled, a radio node shares its channel on time for sending the SPRS with other radio nodes, where the other radio nodes use the transmission opportunity with a short time gap so as not to lose the channel contention. If the channel contention by the first radio node fails, a second radio node will not detect the first radio node's SPRS.

According to second aspect of the present invention, there is provided a method of a second radio node. According to an example embodiment of the present invention, the method comprises:

- transmitting, to a first radio node, a sidelink position reference signal configuration defining at least one position reference signal to be transmitted from the first radio node to the second radio node; and
- receiving at least one sidelink position reference signal transmitted by the first radio node in a bandwidth range at least partially comprised in an unlicensed radio band, wherein the at least one sidelink position reference signal is defined according to the sidelink position reference signal configuration.

According to a third aspect of the present invention, there is provided a first radio node. According to an example embodiment of the present invention, the first radio node comprises a radio modem, non-transitory computer readable media comprising machine readable instructions, and a processor configured to load and to execute the machine readable instructions to cause the first radio device to execute the method according to the first aspect, or its embodiments, and thus to transmit a modified position reference signal to a second radio device via at least one side link channel.

According to a fourth aspect of the present invention, there is provided a second radio node. According to an example embodiment of the present invention, the method comprises a radio modem, non-transitory computer readable media comprising machine readable instructions, and a processor configured to load and to execute the machine readable instructions to cause the second radio device to execute the method according to the second aspect of the present invention, or its embodiments.

According to a fifth aspect of the present invention, there is provided a system for radio communication. According to an example embodiment of the present invention, the method comprising a first radio node as defined by the third aspect, and a second radio node as defined by the fourth aspect of the present invention.

According to a sixth aspect of the present invention, there is provided a computer program element. According to an example embodiment of the present invention, the method comprises machine readable instructions which, when loaded and executed by a processor, cause the processor to perform the method according to the first aspect according to the present invention.

According to a seventh aspect of the present invention, there is provided a computer program element. According to an example embodiment of the present invention, the computer program element comprises machine readable instructions which, when loaded and executed by a processor, cause the processor to perform the method according to the second aspect of the present invention.

According to an eighth aspect of the present invention, there is provided a non-transitory computer readable medium, According to an example embodiment of the present invention, the method comprises the machine readable instructions of the sixth or seventh aspects.

According to a ninth aspect, there is provided a vehicle, comprising a radio communications node according to one of the third or fourth aspects of the present invention.

The present specification therefore proposes two general techniques to access unlicensed frequency bands for side link positioning. The first technique uses licensed (ITS) or dedicated carrier assisted access, where a licensed or dedicated carrier is used on the side link to control the transmission of positioning signals on unlicensed spectrum. The dedicated carrier may also be used to send broadcast information. A further technique is discussed, in which control and positioning signals are both sent on unlicensed spectrum without requiring licensed (ITS) or dedicated carrier assisted access.

BRIEF DESCRIPTION OF THE DRAWINGS

Exemplary embodiments of the present invention are depicted in the figures, which are not to be construed as limiting the present invention, and are explained in greater detail below.

DETAILED DESCRIPTION OF EXAMPLE EMBODIMENTS

Figure 1:
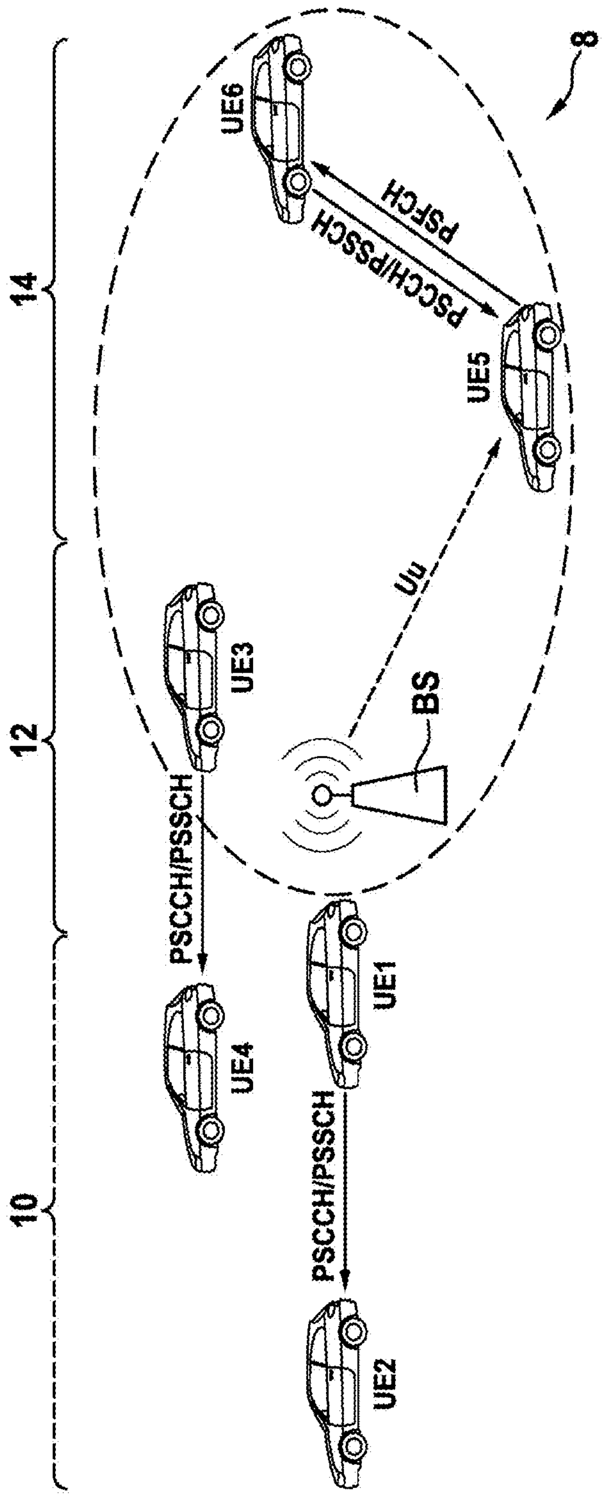
FIG. 1 schematically illustrates an example of a "V2X" configured system comprising a sidelink that can be configured into mode 1 and mode 2.

FIG. 1 schematically illustrates an example of a "V2X" configured system comprising a sidelink that can be configured into mode 1 and mode 2.

The radio standard 5G New Radio (5GNR) provides for a network comprising a next generation node base station (gNB) and a set of User Equipment (UE1, UE2 . . . ). The gNB is used for controlling of communicating data to some, or all of the UEs via the Uu interface. The Uu interface may be considered to be a communication link between a gNB and another network terminal UE. In examples, the UE terminal (also referred to herein as a radio node) may be an IoT device, a vehicular infrastructure element, an industrial automation component, or an industrial infrastructure element. Examples of vehicular infrastructure elements are traffic lights, and streetlights. Examples of an industrial infrastructure element are robots or industrial machines. The UE terminal may be a mobile telephone, laptop computer, tablet, smartwatch, or the like. The UE terminal may be embodied within a vehicle such as an automobile, heavy goods vehicle, bicycle, and the like.

The 3GPP standard provides for the transmission of signals between first and second radio nodes enabling the second radio node to determine its position relative to a first radio node, for example. The signals are typically referred to as "combs" owing to their structure in frequency and time. The first radio node UE1 may be requested by the second radio node UE2 to transmit a position reference signal (PRS) having a comb structure known at the second radio node UE2. When the second radio node UE2 receives the requested PRS from the first radio node, a decoding technique such as downlink angle of departure (DL-AoD), uplink angle of arrival (UL-AoA), Round Trip Time (RTT), downlink Time of Arrival (DL-ToA) or uplink Time of Arrival (UL-ToA) may be applied by the second radio node UE2 to the PRS transmitted by the first radio node UE1. This enables the second radio node UE2 to determine its position relative to the first radio node UE1.

Current implementations of positioning using the PRS only support positioning for classical cellular scenarios, such as positioning between the gNB (base station, BS) and mobile radio nodes UE. Vehicular and industrial applications, when out of coverage (or in partial coverage) of a gNB (base station, BS) require inter-UE positioning without involving the gNB. The present specification details an approach for using the PC5 sidelink to support inter radio-node positioning.

Figure 2:
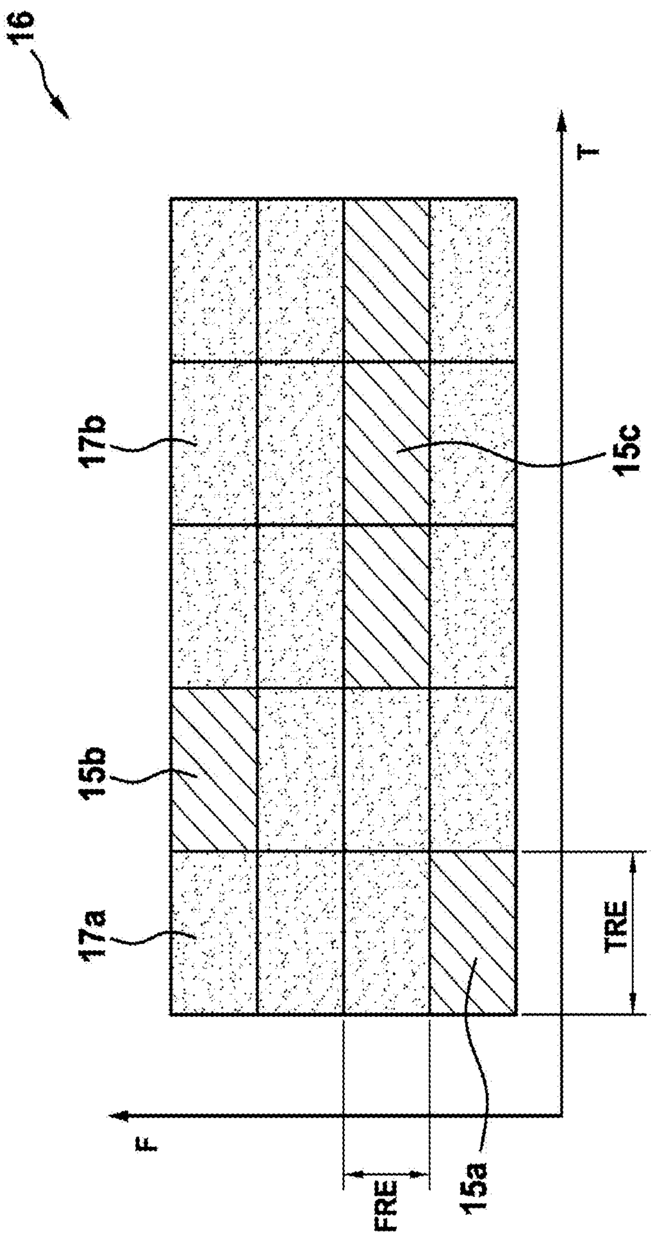
FIG. 2 schematically illustrates an example of time and frequency resource configuration of the sidelink in mode 2.

FIG. 2 schematically illustrates an example of time and frequency resource configuration of the sidelink in mode 2.

The sidelink resource allocation 16 in mode 2 is divided into frequency resource blocks (ranges of subchannels) FRE and time slots TRE. In an example, a subset 17 of the sidelink resource allocation in mode 2 is configured by the gNB. Another subset 15 of the resource allocation is dedicated to autonomously used resources accessed by the radio nodes UE. In an example, one or more UEs may use semi periodic scheduling of the sidelink resource allocation 16 to contend for sidelink resources. In mode 2, resources can be allocated as a one-shot transmission, where the UE transmits into the gNB controlled resource or the autonomously allocated resource as a MAC-PDU because available. In another example, configured sidelink resources may enable a UE to transmit multiple MAC-PDUs on multiple transmission opportunities.

3GPP, release 16, proposed Position Reference Signal configurations, for example, defining the structure of a PRS signal during the downlink and/or uplink between UE and a gNB (BS). The Position Reference Signal configuration also defines on which OFDM symbol and subcarriers the PRS may be found. A PRS positioning frequency layer is defined as a collection of PRS resource sets with each PRS resource set defining a collection of PRS resources. When applied to localisation between a radio node such as a gNB and a radio node such as item of user equipment UE5, one or more downlink Position Reference Signals are used at UE5 transmitted from the gNB (BS). The 3GPP release 16 PRS has a high resource element density having a diagonal or staggered PRS pattern and correlation properties that are better than existing reference signals.

The improved PRS signal of 3GPP release 16 cannot be mapped to the problem of position determination between first and second radio nodes UE1, UE2 via the sidelink in mode 2. In Base Station (gNB) coordinated positioning, the base stations can coordinate which comb patterns from the PRS set, with which offset, are used by the base station, and associated UEs. This prevents a given UE from experiencing a collision of two different PRS at the same time. However, to apply the PRS directly to position determination between first UE1 and second UE2 radio nodes using the sidelink resource pool is problematic because the sidelink resource pool resource selection is performed between at least two UEs autonomously, usually using a distributed contention protocol such as semi persistent scheduling. Therefore, at least two UEs can pick the same offset for transmitting the same PRS pattern, for example. This results in an allocation of overlapping PRS resources. Thus, the sidelink PRS cannot be resolved between UE1 and UE2, degrading the positioning performance.

Furthermore, the PRS comb structure defines the spacing of the PRS for a distinct user. This defines how many users can share one PRS block. There is, therefore, a trade-off between the number of users engaging in positioning using a number of PRS patterns using the same sidelink resource pool, and the performance of the ranging itself.

Figure 3:
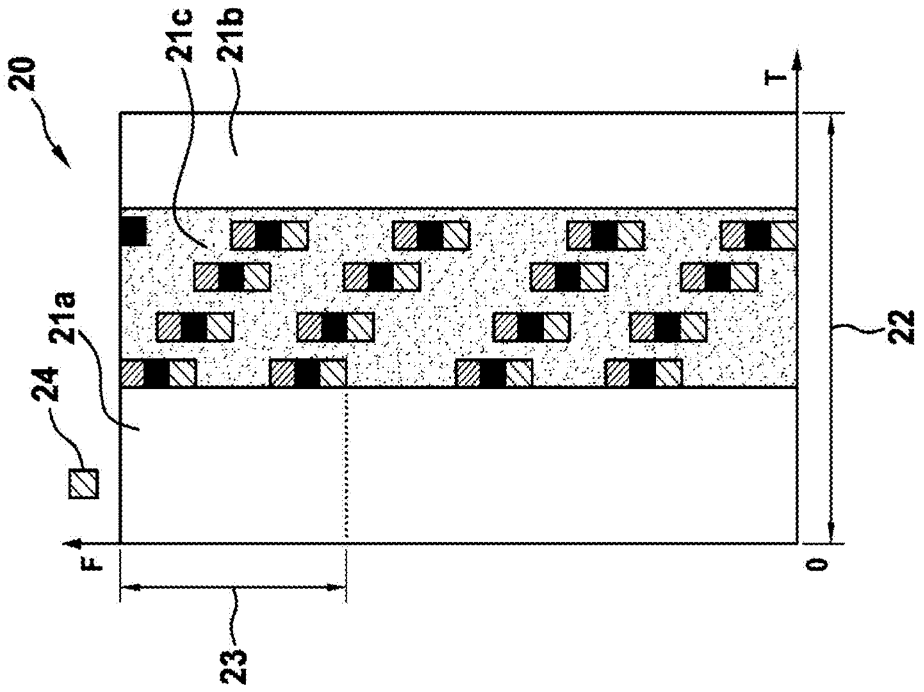
FIG. 3 schematically illustrates resources of a sidelink position reference signal (SPRS) from an RX UE perspective.

FIG. 3 schematically illustrates colliding resources of a sidelink position reference signal (SPRS) from an RX UE perspective.

In FIG. 3, region 20 is a time-frequency plot representing of a portion of the resource grid of a sidelink resource pool from the RX perspective of a first radio node UE1. The subchannel index is illustrated along frequency axis 23 and the time (slot) index indicated along time axis 22. An OFDM slot of multiplexed SPRS from three radio nodes UE1, UE2, and UE3 is illustrated. Regions 21*a* and 21*b* of the sidelink resource pool are areas with data symbols (that are not used for position determination), a gap, or blank symbols. For example, regions 21*a* and 21*b* are regions of licensed bandwidth, and region 21*c* represents a region of unlicensed bandwidth for the transmission of SPRS according to the techniques discussed subsequently. The hatched symbols 24 represent a colliding SPRS.

The technique of this specification is applicable to radio nodes defined according to 3GPP REL-16 NR for unlicensed access, as in RP-201834. In an embodiment, the first and second radio nodes comply with scenario A: carrier aggregation between licensed band NR (PCell) and NR-U (SCell). In an embodiment, the first and second radio nodes comply with scenario B (dual connectivity between licensed band (PCell) and NR-U (PSCell). In an embodiment, the first and second radio nodes comply with scenario C (stand-alone NR-U). In an embodiment, the first and second radio nodes comply with scenario D (a stand-alone NR cell in unlicensed band and UL in licensed band. In an embodiment, the first and second radio nodes comply with scenario E (dual connectivity between licensed band NR and NR-U).

In LTE, licensed assisted access for the downlink was initially introduced using "listen before talk" (LBT) to avoid collision with existing transmission in the unlicensed bands. Licensed assisted access enhancements (eLAA) introduced LBT on the uplink. 5G new radio introduces unlicensed operation for both uplink (UL) and downlink (DL) either in licensed coverage or unlicensed coverage. In this case, a radio node such as a UE or qNB starts an LBT channel sensing to discover nearby interference. After winning an LBT, either the gNB or the UE initiate a channel occupancy time (COT). A COT is dependent on many factors, such as the frequency of LBT-false, the number of HARQ NACKS, etc. during the COT, the UE or gNB transmit their UL or DL, simultaneously.

NR for unlicensed operation introduces two approaches for channel sharing based on supported traffic needs: a load-based event LBE or a frame-based event FBE COT. In LBE, either the UE or gNB access the channel after a successful LBT when there is data to be transmitted in the uplink or downlink. In this case, the radio node is only able to start an LBT directly before a pre-scheduled UL-grant to be able to occupy its scheduled time slot. In a not very different occupancy and granting procedure, FBE is performing an LBT in a time deterministic manner, however a COT is shared with the other devices to send feedback or return traffic.

The COT sharing between uplink and downlink has to guarantee a short time gap between the traffic direction switching between a first device (initiating the COT) and a second device (sharing the same COT) such as not more than 16 μs. After such a gap, the second device is supposed to share the COT and send the opposite traffic after a short sensing interval (LBT-CAT2) or no sensing (LBT-CAT4). However, if a short LBT is mandated, the second device refrains from transmission if the LBT result is negative.

Figure 4B:
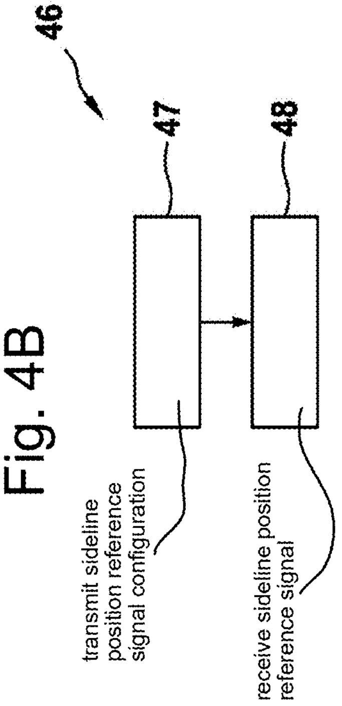
FIG. 4B schematically illustrates a method of a second radio node according to the second aspect of the present invention.
Figure 4A:
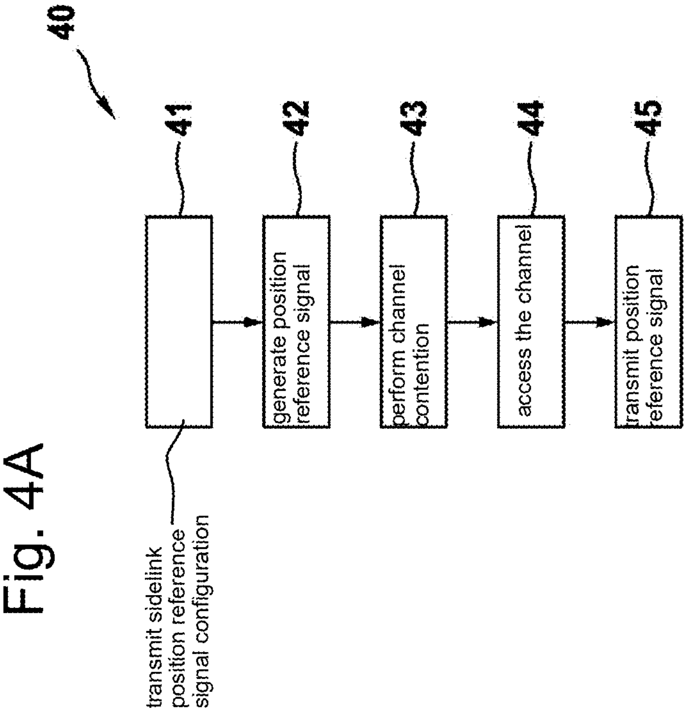
FIG. 4A schematically illustrates a method of a first radio node according to the first aspect of the present invention.

FIG. 4A schematically illustrates a method of a first radio node according to the first aspect.

According to a first aspect, there is provided a method 40 of a first radio node UE1, comprising:

- transmitting 41, from the first radio node UE1, sidelink position reference signal configuration, 72, 83 defining at least one position reference signal to be transmitted from a first radio node UE1 to the second radio node UE2;
- generating 42 at least one position reference signal as defined by the SPRS configuration transmitted to the second radio node UE2;
- performing 43 channel contention LBT for the purpose of position reference signal transmission in a bandwidth range at least partially comprised in an unlicensed radio band F2, wherein the contention is performed using a listen before talk mechanism;
- based on a positive result of the channel contention, accessing 44 the channel for the duration of a channel on time; and
- transmitting 45 the at least one position reference signal to the second radio node UE2 during the channel on time.

The technique of the first aspect covers two approaches for enabling access to unlicensed bands for SPRS purposes.

First Approach: Licensed/ITS/Dedicated Carrier Assisted Access for Unlicensed Bands The first approach handles data transmission and reception in a licensed band F1, and the transmission of a side link ranging pilot transmission SPRS in an unlicensed band F2. In an embodiment, the first radio node performs channel contention on a licensed carrier F1 using the first channel contention technique. In an embodiment, the unlicensed carrier F2 supports channel contention using another channel access mechanism for example LBT, Clear Channel Assessment CCA, or monitoring of the channel occupancy time COT.

In an embodiment where the channel access mechanism concerned monitoring the COT, channel access may be arranged as a frame-based event or a load-based event.

According to the first approach, the licensed band F1 carries information and configuration commands for SPRS symbols intended to be transmitted, for example, from a first radio node UE1 to a second radio node UE2 (such as an interlace pattern, and slot or a transmission schedule of the SPRS). Accordingly, the first radio node may conduct an SPRS configuration transmission 72, 83 following regulatory requirements (such as LBT, CCA, COT determination) before transmission of the SPRS itself in the unlicensed band F2. In an embodiment, a receiving radio node can decode information received in the licensed carrier F1 relating to the side link positioning configuration (interlace pattern, slot and/or transmission schedule of the SPRS) in the unlicensed band F2. The second radio node obtains the information received in the licensed carrier F1 to assist the second radio node to tune to the side link positioning transmission opportunity TO.

Figure 5:
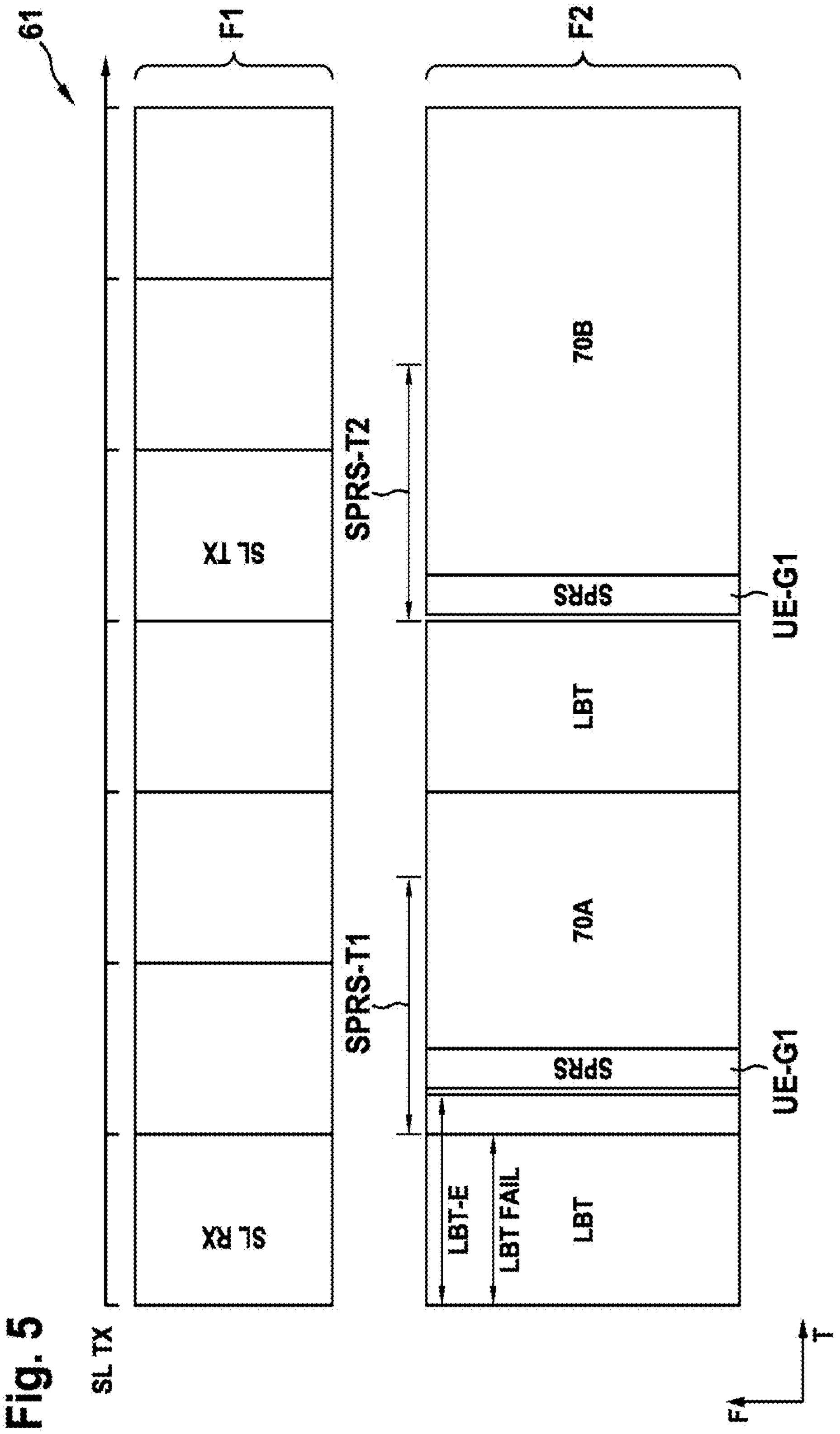
FIG. 5 schematically illustrates a first example of establishing an SPRS exchange on an unlicensed carrier.

In the first approach, an optional mode is fully arbitrary (the embodiment illustrated in FIG. 5). In this embodiment, a first radio node UE1 or group of radio nodes UE-G1 may signal an intention to schedule one SPRS pattern configuration (for example, one SPRS pattern out of a total of N possible patterns enabled by the relevant interlace) at a certain synchronised sidelink slot SL TX. In this embodiment, the first radio node UE1 or group of radio nodes UE-G1 are configured to sense the unlicensed carrier F2 for free channel access using a channel contention mechanism and to send at least one SPRS without mandating for short-control or physical control information. The assumption is that all necessary control information has been conveyed via signalling in carrier one.

In a quasi-asynchronous variation of the foregoing example, there is a possibility to advance from synchronised and unicast or group cast of the sidelink communication on the licensed carrier F1. In an embodiment, a first radio node UE1 may select its SPRS position in time and frequency based on a pre-configuration or a dynamic network configuration. In an embodiment, the first radio node UE1 initiates channel contention, such as LBT, to assess the availability of a free SPRS transmission opportunity. The first radio node UE1 sends an SPRS signal or pattern to cover a predetermined percentage of the nominal frequency. For a group of radio nodes UEs, each radio node may select a different SPRS format definition (interlace pattern) to use in the same percentage of the nominal frequency, so that the transmission by the SPRS group of UEs multiplex themselves on the same resources. In an embodiment, the interlace structure of the SPRS is chosen randomly by each radio node in the group of radio nodes to avoid collisions between SPRS patterns.

In an embodiment, a radio node, or group of radio nodes, are configured with a possible set of SPRS format definitions (set of interlace structures for the SPRS) and a reservation procedure for each SPRS format definition in the set of SPRS format definitions. A group of radio nodes is configured to select from the SPRS format definitions and reserve their respective selections in a reservation field. Then, each radio node transmits this reservation by signalling to other radio nodes via side link signalling. In an embodiment, one or more radio nodes in a group of radio nodes UE-G perform channel contention using, for example, LBT, to assess an availability of a free SPRS transmission opportunity (SPRS-T1 . . . ) schedule for this pattern. If free, the first radio node starts an SPS transmission to block the free SPRS transmission schedule.

In an embodiment, the SPS may be preceded optionally by a preamble or a short control information transmission. If other scheduled radio nodes are able to detect the initial transmission, and can decode the initial COT information signalled in the licensed band F1 or optionally preceding the SPRS in a short control information, the next scheduled radio node UE or group of radio nodes UE-G can share the channel occupancy time as long as the channel occupancy time is not finished.

Second Approach: Stand-Alone Unlicensed Band Channel Access

In the second approach, a self-organised channel access technique for side link positioning in the unlicensed band F2 is considered. In this approach, the unlicensed carrier F2 is used exclusively for side link positioning, or the unlicensed carrier F2 is used for a combination of cycling positioning and data communication. According to the second technique, synchronisation via the communication exchanges on the licensed carrier F1 is not required. In an embodiment, radio nodes may synchronise using the unlicensed carrier F2 by sending broadcast and/or synchronisation information on the unlicensed carrier F2.

In an embodiment, synchronisation on the unlicensed carrier F2 comprises 3GPP synchronisation techniques. For example, synch to synch master/GNSS, synch to gNB (broadcasting the synch signal in either of the licensed or unlicensed bands), synch to a synch source UE, and the like. The synchronisation signalling can be exchanged to the licensed carrier F1. In an embodiment, if only unlicensed carrier F2 is available and no other synchronisation sources are available, synchronisation between radio nodes can be conducted via configuring the resource pool in mode 2 (but in the unlicensed band) and exchanging a synchronisation sequence before engaging in positioning.

According to the second approach, the SPRS is transmitted asynchronously. The first radio node UE1 or group of radio nodes UE-G simultaneously perform a channel contention technique, for example LBT, and one or more of radio nodes UE1 discover the unlicensed band F2 to be free. In this case, the first radio node UE1 with a winning channel contention may allocate one out of N total SPRS format definitions (interlace patterns) in frequency. In an embodiment, the SPRS format definitions may be selected randomly. The selected pattern in time and frequency is, following a successful training contention, used to transmit the short control and SPRS structure. Other radio nodes can only receive short control and/or SPRS transmissions or try to capture the channel to send SPRS and/or short control.

Figure 9:
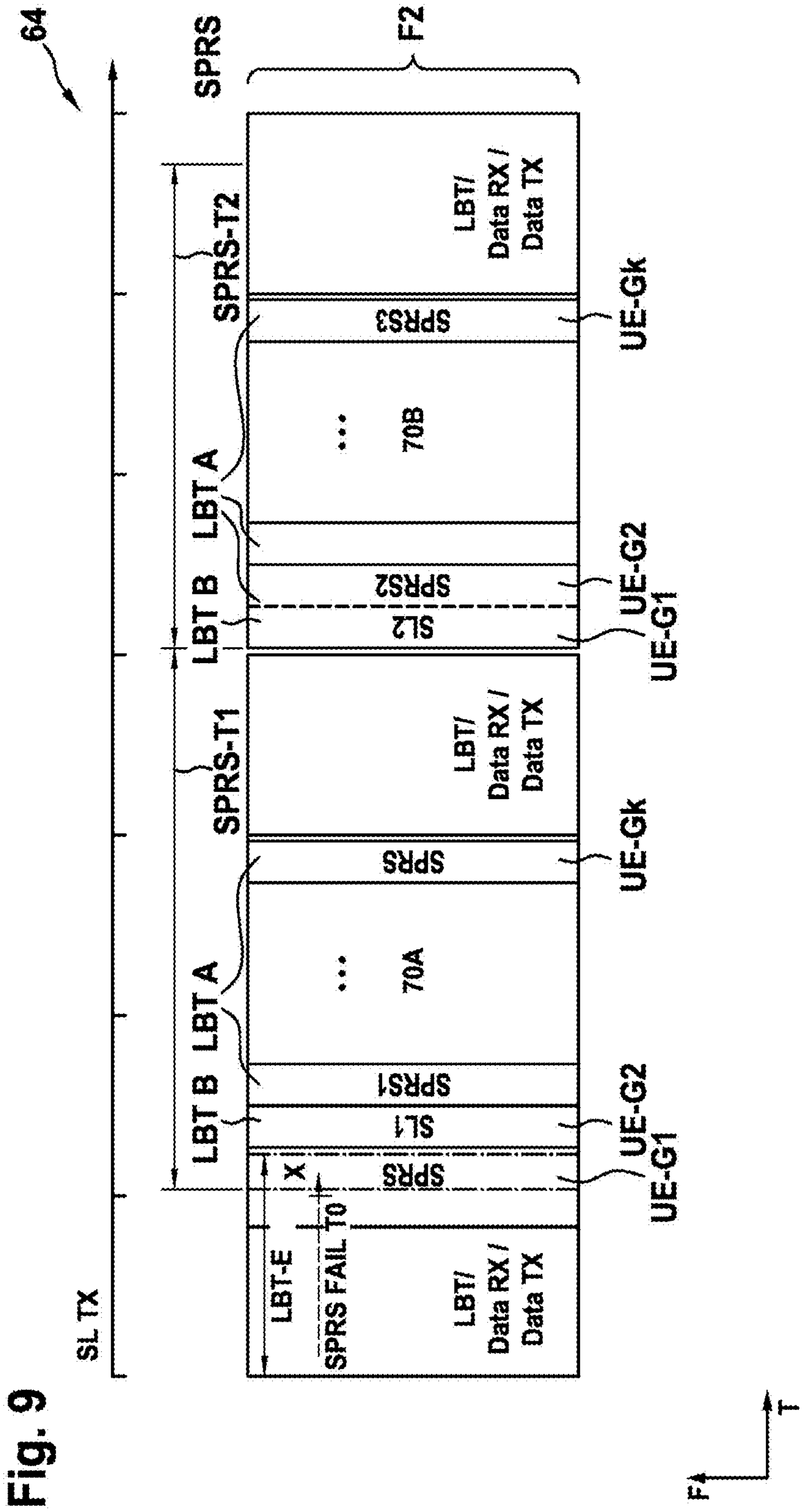
FIG. 9 schematically illustrates a fourth example of establishing an SPRS exchange on an unlicensed carrier.

In an embodiment, channel occupancy time-sharing of a radio node needing to send an FBE or LBE SPRS is performed. The first radio node UE1 or group of asynchronous radio nodes UE-G sense the channel using an initial channel contention process. Based on the success of the channel contention process, the first radio node or group of asynchronous radio nodes select 1 out of N SPRS format definitions (interlace patterns) and perform short-control transmission and SPRS. Any other station (or group of stations) which are sensing the network and are able to decode possible short information (with a COT duration) and SPRS may share the initial initiated COT by UE1 and send their SPRS following also an SPRS format definition. Other radio nodes or groups of radio nodes may share the initiated initial channel occupancy time COT as far as the COT is sufficient for more SPRS and/or short-control transmission. In case of an FBE, the initiated COT may send some information about the periodicity of the SPRS, i.e, wherein the initial procedure is repeated before each period, as illustrated in FIG. 9 below.

According to an embodiment, the first radio node UE1 is configured to use a side link (such as a 5G NR sidelink) in the licensed band F1 (ITS or licensed carrier). According to an embodiment, the second radio node UE2 is configured to use a side link to perform side link positioning on the unlicensed carrier F2.

Embodiments of the first radio node concerns a method in which the transmission opportunity of an SPRS is provided so that the transmission opportunity is concurrent with the transmission or reception in another carrier. Additionally, embodiments specify the behaviour of the first radio node for channel contention (such as listen before talk) in the case of a win or fail.

The following description discusses five options. Options one, two, and three concern embodiments in which the licensed band F1 is dedicated to assisting positioning in the unlicensed band F2. In such case, it is expected that the licensed or dedicated side link band F1 is used to convey data and control signals to radio nodes in the immediate neighbourhood 10, 12, 14 of the first radio node UE1. It is also assumed that subsequent control signals on the licensed or dedicated band F1 carry configuration information in respect of the unlicensed side link band F2 that is dedicated for positioning. Options four and five concern unlicensed side link positioning embodiments that do not require communication in the licensed side link band F1.

Option 1—Preconfiguration

FIG. 5 schematically illustrates a first example of establishing an SPRS exchange on an unlicensed carrier.

According to an embodiment, there comprises obtaining, from the SPRS configuration 72, 83, the synchronisation of the at least one position reference signal to at least one transmission opportunity of the side channel, and if the channel contention LBT for the purpose of position reference signal transmission is positive during the at least one transmission opportunity of the side channel:

transmitting the at least one position reference signal to the second radio node UE2 during the channel on time.

According to an embodiment, at least the first UE1 and second UE2 radio nodes are members of a 5G NR radio network.

According to an embodiment, the licensed radio band F1 comprises a vehicle to everything V2X sub band of the 5G NR radio network.

According to an embodiment, the unlicensed radio band F2 is comprised within at least one of the following ranges: 5150-5925 MHz; 5150-5350 MHZ (WAS/RLAN); 5470-5725 MHZ (WAS/RLAN); 5725-5855 MHZ (FWA); 5855-5875 MHz; 5875-5925 MHz (ITS), 5150-5250 (U-NII-1) 5250-5350 (U-NII-2A) 5350-5470 (U-NII-2B) 5470-5725 (U-NII-2C) 5725-5850 (U-NII-3) or 5850-5925 (U-NII-4).

According to an embodiment, the first UE1 and/or second radio UE2 nodes operate in either Frame Based Equipment mode or Load Based Equipment mode.

FIG. 5 is a time-frequency matrix that denotes channel events on licensed carrier F1 and unlicensed carrier F2 at the same time. According to a first technique, data transmission and reception and/or control transmission and reception is handled in the licensed carrier F1. Regions 70A, 70B define areas of the unlicensed band F2 that contained no transmission, or other technologies such as Wi-Fi(™) or other signals transmitted in the unlicensed band F2 by other UE groups. SPRS-T1, SPRS-T2 correspond to potentially configurable SPRS transmission opportunities on the unlicensed band F2. In the licensed band F1, axis 61 defines SL slots to which the second radio node UE2 is synchronised in a SYNC operation 71. For the purposes of this example, it is assumed that only one UE group is present in the unlicensed band F2 comprising the first radio node UE1 and the second radio node UE2.

For example, in the first option, data and/or control and limited configuration for the SPRS are communicated from the first radio node UE1 to the second radio node UE2 via the licensed band F1 (SL RX, SL TX). The unlicensed band F2 carries the SPRS according to transmission opportunity TO that is relatively positioned to synchronisation control signals received in the licensed band F1. According to the first option, channel occupancy time COT sharing is not performed, with the unlicensed band used for LBE. In this option, the first and/or second radio nodes communicate in load-based equipment mode LBE.

According to the embodiment of option 1, the licensed band carrying the side link F1 carries an SPRS configuration 72, 83 for the SPRS (SLTX, SLRX) that will be transmitted in the unlicensed band F2. For example, the licensed band carries a possible SPRS signal format defining an interlace pattern, the channel on time, and expected potential positioning opportunities. One or more of the signals may be referenced to the configured synchronisation 80 of the carrier transmitted in the licensed band F1 including, for example, the slot configuration). When the first radio node UE1 accesses the unlicensed carrier UE2, the channel contention operation performed by the first radio node UE1 (such as LBT) should be started early enough to enable synchronised transmission of an SPRS on the unlicensed carrier UE2 in the event that the LBT is successful.

If the channel contention in the unlicensed band F2 (LBT) is successful, the first radio node UE1 shall send the SPRS within the possible Tx opportunity (for example, SPRS-T1 in 70A). If the channel contention in the unlicensed band F2 (LBT) is not successful, the first radio node UE1 extends the channel contention window LBT-E (corresponding to the clear channel assessment CCA) until the first radio node UE1 successful in the channel contention for the unlicensed carrier F2. Then, the first radio node UE1 transmits the SPRS without extending the possible SPRS window SPRS-T1. If the channel contention for the unlicensed carrier F2 is not won before the possible SPRS transmission opportunity is finished, the first radio node UE1 shall cancel the SPRS transmission and configure a new opportunity SPRS-T2. In this case, the new opportunity is also an LBE-based transmission in the unlicensed band F2.

As shown in FIG. 5, a first group of radio nodes UE-G1 is optionally provided. When a radio node UE is transmitting an SPRS in this group, it may apply a interlace pattern toe each SPRS that is orthogonal to the pattern of other radio nodes UEs within the same group UE-G1. Therefore, if two radio nodes select the same pattern, it is optionally possible that the collision is resolved using a different orthogonal code for each radio node.

Figure 6:
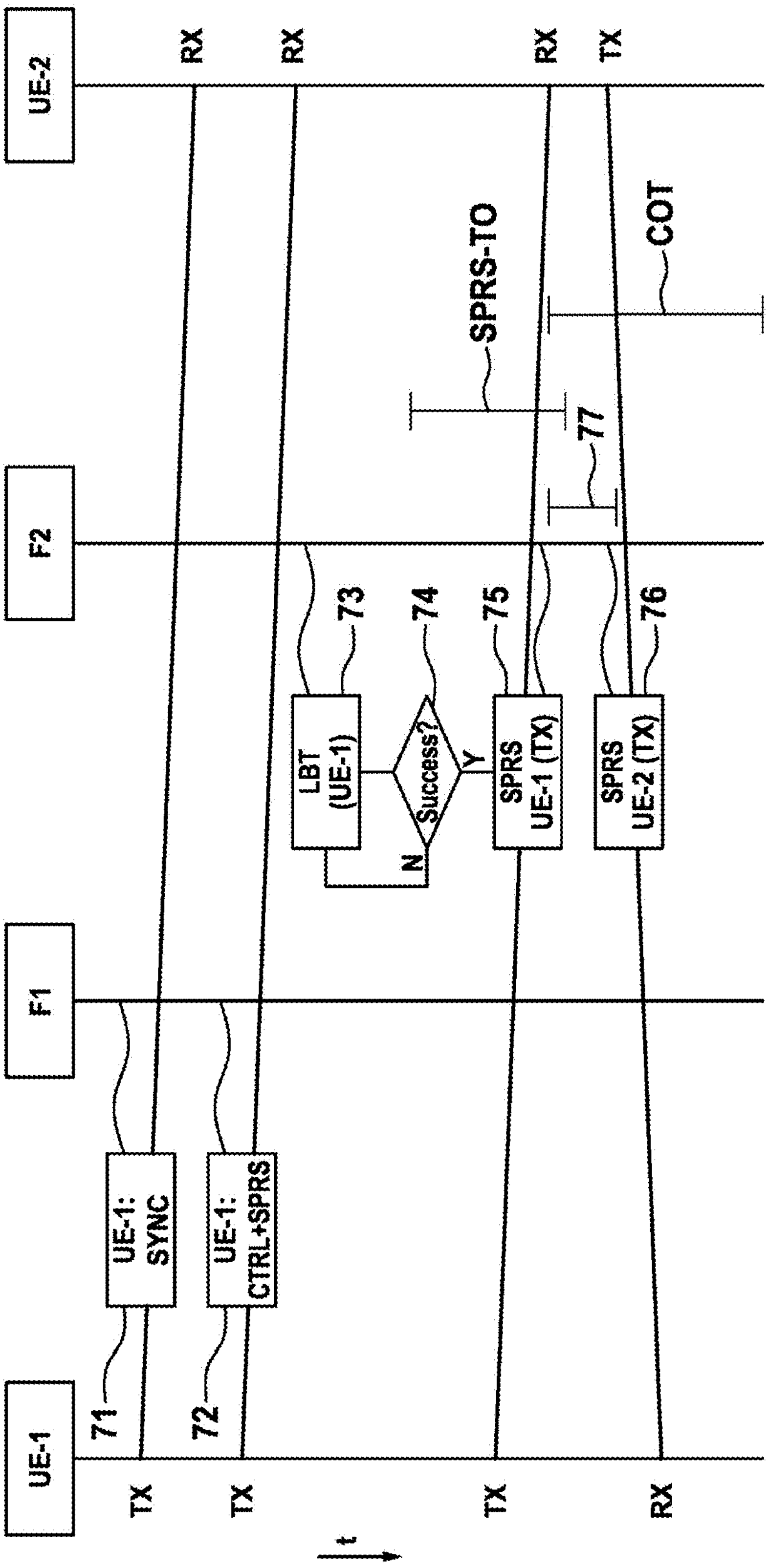
FIG. 6 schematically illustrates a signalling protocol establishing an SPRS exchange on an unlicensed carrier, using control signals sent on a licensed carrier.

FIG. 6 schematically illustrates a signalling protocol establishing an SPRS exchange on an unlicensed carrier utilizing control signals sent on the licensed carrier.

For example, FIG. 6 illustrates the process of transferring signals between a first radio node UE1, a second radio node UE2, related to licensed band F1 and an unlicensed band F2. Initially, the first radio node UE1 transmits time synchronisation 71 SYNC on the licensed band F1 to the second radio node UE2. The first radio node UE1 transmits an SPRS configuration 72 comprising control data and/or a first SPRS configuration message to the second radio node UE2. The first radio node UE1 performs channel contention 73, 74 on the unlicensed band F2 and if the channel contention is successful, the first radio node UE1 transmits an SPRS 75 to the second radio node UE2 within the SPRS-TO defined by the synchronisation 71. The SPRS 75 transmitted corresponds to the definition of the previously signalled SPRS configuration. For example, the SPRS configuration may comprise a description of the SPRS comb to be transmitted in terms of occupied bandwidth, occupied slots, interlace definition, and the like. The SPRS is received by the second radio node UE2 may be used to compute the relative position of the first radio node UE1 relative to the second radio node UE2.

If the channel contention 74 is not successful, the first radio node UE1 attempts a discrete number of further channel contention operations in the unlicensed band F2. In an embodiment, following a permitted time gap 77 relative to the channel on time COT initiated relative to the transmission of the first SPRS, the second radio node UE2 transmits 76 a further SPRS to the first radio node UE1. In an example, the SPRS 76 corresponds to the definition of the previously signalled SPRS configuration. In another example (not shown), either the first radio node UE1 or the second radio node UE2 may engage in signalling to negotiate a different SPRS configuration for the SPRS transmitted from UE2 to UE1. The response can be used by the first radio node UE1 to compute its position relative to the second radio node UE2 according to conventional techniques such as RTT.

According to an embodiment, the SPRS configuration 72, 83 is transmitted to the second radio node UE2 via a sidelink channel in a licensed radio band F1 of a radio access network.

According to an embodiment, the SPRS configuration 72, 83 is transmitted by the first radio node UE1 via at least one of Physical Sidelink Shared Channel PSSCH, a Physical Sidelink Control Channel PSCCH, a Physical Downlink Shared Channel PDSCH, a Physical Downlink Control Channel PDCCH of the radio access network, or a Physical Sidelink Broadcast Channel PSBCH.

A variant of option one is now discussed as option two. According to the second option, in which the SPRS transmission is quasi asynchronous, the licensed band F1 carries data, control, and configuration of the SPRS when transmitted on the unlicensed band F2. The unlicensed band F2 carries SPRS having a scheduled relative to a transmission opportunity defined in the synchronisation of the licensed band F1. This may be applied to FBE or LBE-type COT sharing.

Figure 7:
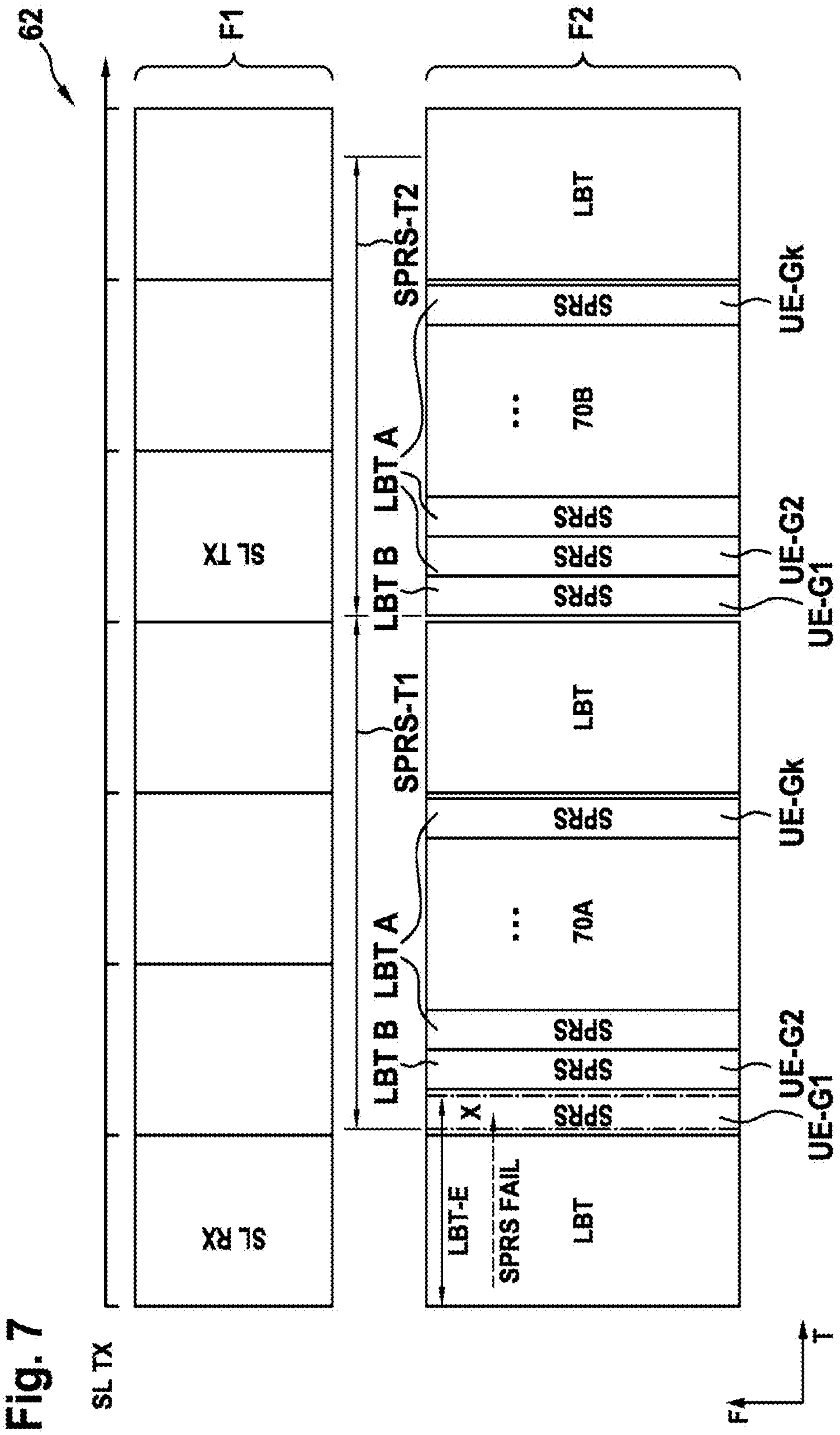
FIG. 7 schematically illustrates a second example of establishing an SPRS exchange on an unlicensed carrier.

FIG. 7 schematically illustrates a second example of establishing an SPRS exchange on an unlicensed carrier according to a second option.

According to an embodiment, the method comprises:

- transmitting, to the second radio node UE2, a periodicity specifier 80 defining a plurality of further position reference signal 76, 87 transmission opportunities of the first radio node UE1, and/or a plurality of further radio nodes relative to an initial position reference signal transmission opportunity SPRS-T1;
- performing, at the first radio node UE1, a plurality of further channel contention LBT operations corresponding to each of the plurality of position reference signal transmission opportunities;
- based on a positive result of at least one of the further channel contention operations, accessing the channel for the duration of the channel on time; and
- transmitting at least one further position reference signal 76, 87 to the second radio node UE2 during the channel on time as defined by the periodicity specifier 80.

According to the second option 62, the first radio node UE1 configures a periodicity of its SPRS transmissions in the unlicensed band F2. This corresponds to a frame-based equipment FBE mode on the unlicensed band F2. Accordingly, a further radio node may schedule transmission of its further SPRS by utilising the channel on time COT signalled by the first radio node UE1. This can be referred to as COT sharing. In this case, radio nodes in the group UE-G1 do not need to maintain a gap between their SPRS transmissions suitable for COT sharing. If the first radio node does not share its channel on time COT in the licensed band F1, other radio nodes in UE-G1 will not be able to share the channel on time and may need to perform channel contention (LBT) for each transmission.

As shown in FIG. 7, the first radio node UE1 preconfigures, or signals in a licensed band F1 an SPRS for multiple user groups UE-G1, UE-G2, UE-GK. In an example, an initial transmission in respect of an SPRS in a first user group UE-G1 scheduled in the unlicensed band F2 using LBT CAT-4 type channel contention for the initial transmission, and LBT-CAT-2 or CAT-1/0 for other SPRS group transmissions sharing the COT of the initial transmission. In general, an embodiment at least one radio node UE1 comprised in a first group UE-G1 of radio nodes performs an initial SPRS transmission in the unlicensed band F2 using a first type of channel contention, and a second group UE-G2 of radio nodes performs a subsequent SPRS transmission in the unlicensed band F2 using a second type of channel contention. In an embodiment, at least the first group of radio nodes UE-G1 and the second group of radio nodes UE-G2 share the channel on time initiated by a radio node UE1 in the first group of radio nodes UE-G1.

According to an embodiment, the method comprises:

transmitting, to the second radio node UE2, a schedule of further position reference signal 76, 87 transmission opportunities of the first radio node UE1, and/or a plurality of further radio nodes;

performing, at the first radio node UE1, a plurality of further channel contention LBT operations corresponding to each of the plurality of position reference signal transmission opportunities;

based on a positive result of at least one of the further channel contention operations LBT, accessing the channel for the duration of the channel on time; and transmitting at least one further position reference signal 76, 87 to the second radio node UE2 during the channel on time as defined in the schedule of further position reference signal transmission opportunities.

A variant of the second option, as now discussed as the third option, also illustrated by FIG. 7. In this embodiment, the first radio node UE1 (or in other words, the radio node that performs channel contention first in the unlicensed band F2) is configured to share its channel on time COT within the time period designated SPRS-T1, SPRS-T2, and to configure a periodically active transmission instance for a plurality of radio nodes UEs in one or more user groups UE-G1, UE-G2. Every other radio node UE may share the channel on time provided the channel on time has not expired, and no longer than the allowed gap is left between one UE and the next UE. If, unintentionally, a gap is left between one radio node UE sharing a previously organised on time, channel contention is mandated. Therefore, option three may be considered to be a synchronous S mode in which the licensed band F1 carries data, control and expected configuration of the SPRS on the unlicensed band F2, and the unlicensed band F2 carries SPRS that are strictly scheduled to transmission opportunities, as may be useful with an FBE mode.

According to an embodiment, the channel contention LBT performed by the first radio node UE1 for the purpose of position reference signal transmission is a category 4 listen before talk operation.

According to an embodiment, the channel contention LBT performed by the first radio node UE1 for the purpose of further position reference signal 76, 87 transmission opportunities is a category 2 listen before talk operation.

Options concerning the second approach in which channel access for SPRS is negotiated without use of the licensed band are now discussed.

According to an embodiment, the SPRS configuration 72, 83 transmitted by the first radio node UE1 is received in the bandwidth range of the unlicensed radio band F2, during the channel on time associated with channel contention LBT for control signalling.

Figure 8:
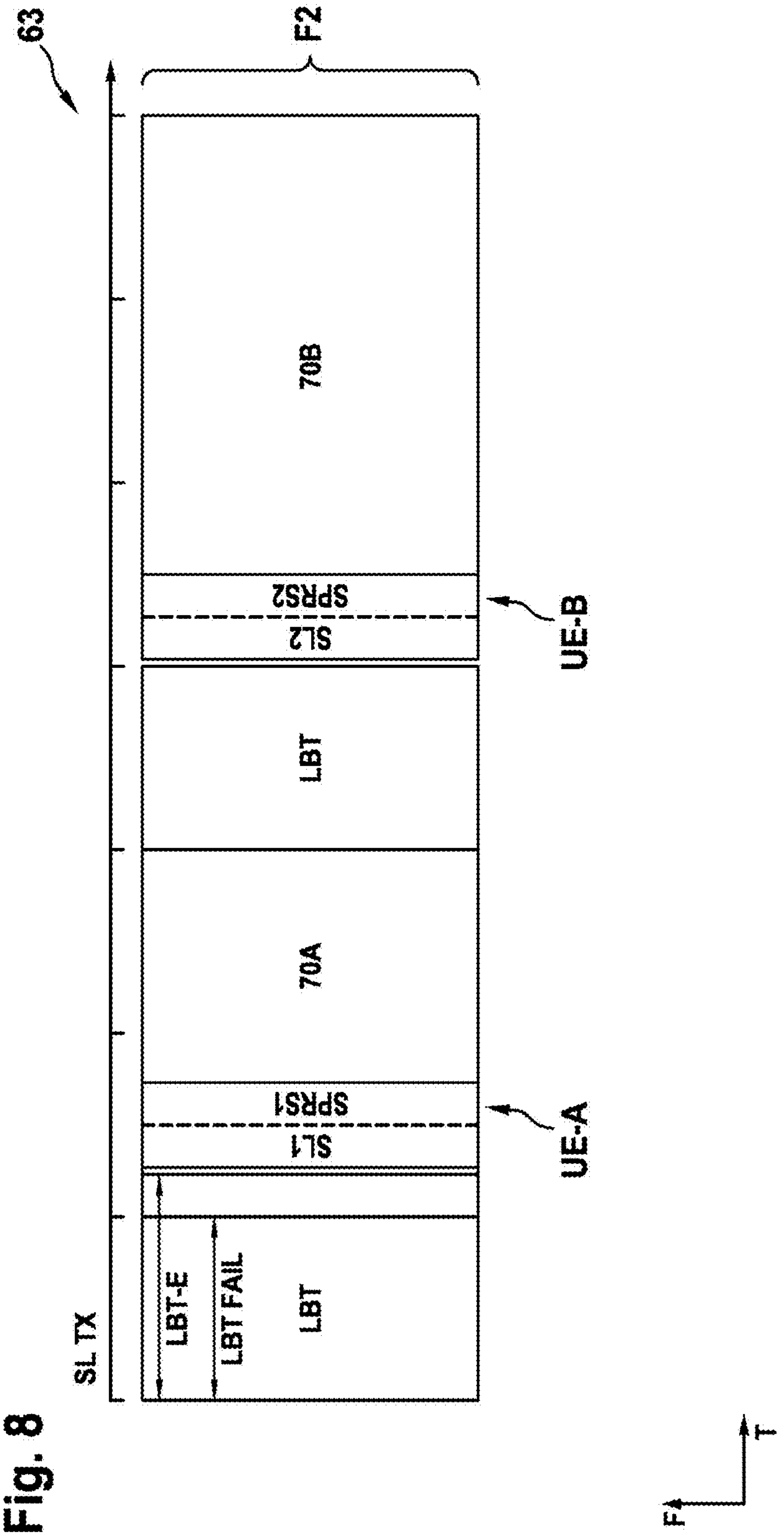
FIG. 8 schematically illustrates a third example of establishing an SPRS exchange on an unlicensed carrier.

FIG. 8 schematically illustrates a fourth option of establishing an SPRS exchange on an unlicensed carrier. This does not require additional use of the licensed band F1.

According to the fourth option, data transmission and SPRS transmission occurs on the unlicensed band F2. Channel contention is performed every time a radio node sends control and data, or control data and SPRS, or only short control information followed by SPRS. Each time there is a normal control or short control, the first radio node signals the configuration of the SPRS (such as duration, pattern and the like, and COT duration).

In FIG. 8, slots SL1, SL2 in the unlicensed band F2 denote short control channels used to communicate the transmission of an SPRS from a first radio node UE1. Following transmission of the short control channels SL1, corresponding SPRS are transmitted, where the transmission of SPRS of a certain radio node is not coordinated with other radio nodes. The short control SL1, SL2 and SPRS are only sent after channel contention (LBT). UE-A, UE-B denote individual radio nodes.

According to the third option 63, the first radio node UE1 shares its channel on time in the unlicensed band F2 with other radio nodes, and may configure SPRS periodically using control signals transmitted in the unlicensed band F2. In this embodiment, there are no dedicated transmission opportunities, and the channel on time between radio nodes is shared. At least one other radio node UE may share the channel on time COT of the first radio node UE1 provided the channel on time COT of the first radio node UE1 is not expired, and no longer than and allowed gap is left between transmission of the first radio node and the subsequent radio node. If, unintentionally, a gap is left between radio node UE1 sharing the unlicensed band F2 and a following radio node, channel contention is performed.

FIG. 9 schematically illustrates a fifth option of establishing an SPRS exchange on an unlicensed carrier. According to the fifth option, both control and position signalling occur exclusively on the unlicensed band F2. The initial SPRS with channel contention (LBT) is performed, in other words, once an initial transmission opportunity of an SPRS is detected by a radio node, the initial dedicated COT.

For example, a plurality of radio node groups UE-G1, UE-G2, to UE-GK perform group-cast communication and coordinated side link communication in the unlicensed band F2. In this case, the SPRS is signalled, for example, in the short control channel SL1, SL2 and the SPRS reference is sent following the control channel. The transmission of other SPRS radio node groups may share the channel on time COT of an initial SPRS transmission. The initial SPRS transmission may only be performed after channel contention. Therefore, in general, the fifth option provides a plurality of groups of radio nodes UE-G1, UE-G2, to UE-GK performing positioning on the unlicensed band F2 a first radio node UE1 in a first group of radio nodes UE-G1 forms channel contention LBT-E to initially access the unlicensed channel F2, thus initiating a channel on time during SPRS-T1, and in this time a first SPRS and control information SL1 is sent from the first radio node UE1. Other radio nodes in other groups of radio nodes UE-G2, UE-GK may then share the channel on time within SPRS-T1 to transmit subsequent positioning signals. The initial access of the unlicensed channel F2 is optionally performed using CAT-4 LBT. The subsequent access to the unlicensed channel within the channel on time within SPRS-T1 is performed using LBT-short (CAT-2) signalling.

Figure 10:
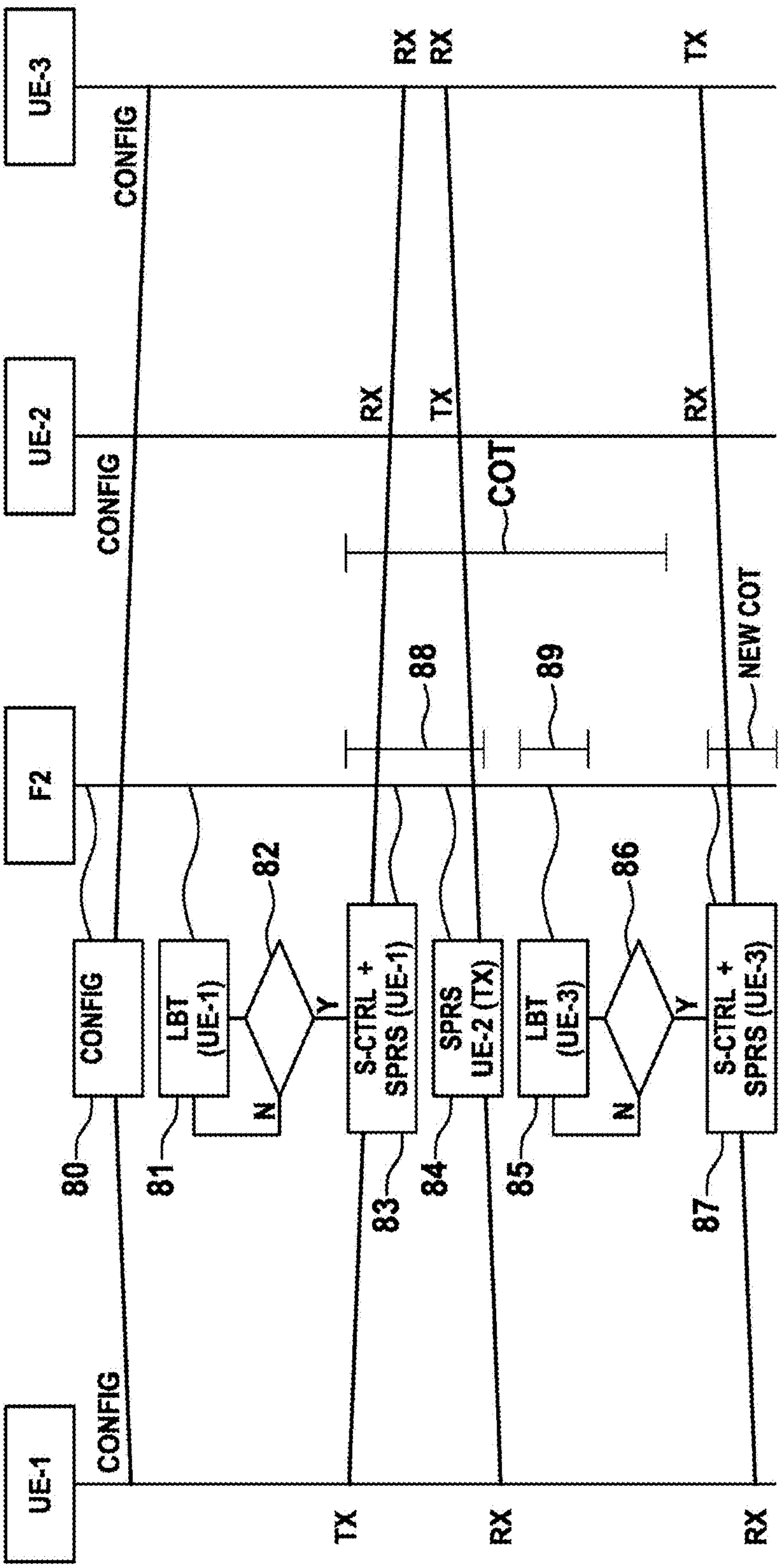
FIG. 10 schematically illustrates another example of a signalling protocol for establishing an SPRS exchange on an unlicensed carrier, using control signals send on an unlicensed carrier.

FIG. 10 schematically illustrates another example of a signalling protocol for establishing an SPRS exchange on an unlicensed carrier, using control signals sent on an unlicensed carrier.

In the example of FIG. 10, a first radio node UE1, the second radio node UE2, and a third radio node UE3 communicate via an unlicensed band F2. Initially, a resource pool in the unlicensed band is configured 80 either via a pre-configuration received from a UE or a gNB, or previously stored configuration. A first radio node UE1 forms channel contention (LBT) 81 and, if successful 82, transmits a short control to configure subsequent signalling, and a first SPRS configuration 83 to at least the second radio node UE2 and optionally the third radio node UE3 (the third radio node UE3 may passively receive all SPRS transmitted by the first radio node UE2 and using for positioning). The second radio node UE2 transmits 84 its SPRS within the allowed gap 88 initiated by the transmission of the short control and first SPRS. The first radio node UE1 and optionally the third radio node UE3 receive the SPRS transmitted by the second radio node UE2. If an amount of time 89 greater than the allowed gap 88 elapses, then a third radio node UE3 must perform a new channel contention operation UE3 in order to access the unlicensed band upon completion of the channel contention, the third radio node transmits a renewed short control S-CTRL and its SPRS on the unlicensed band F2.

Figure 11:
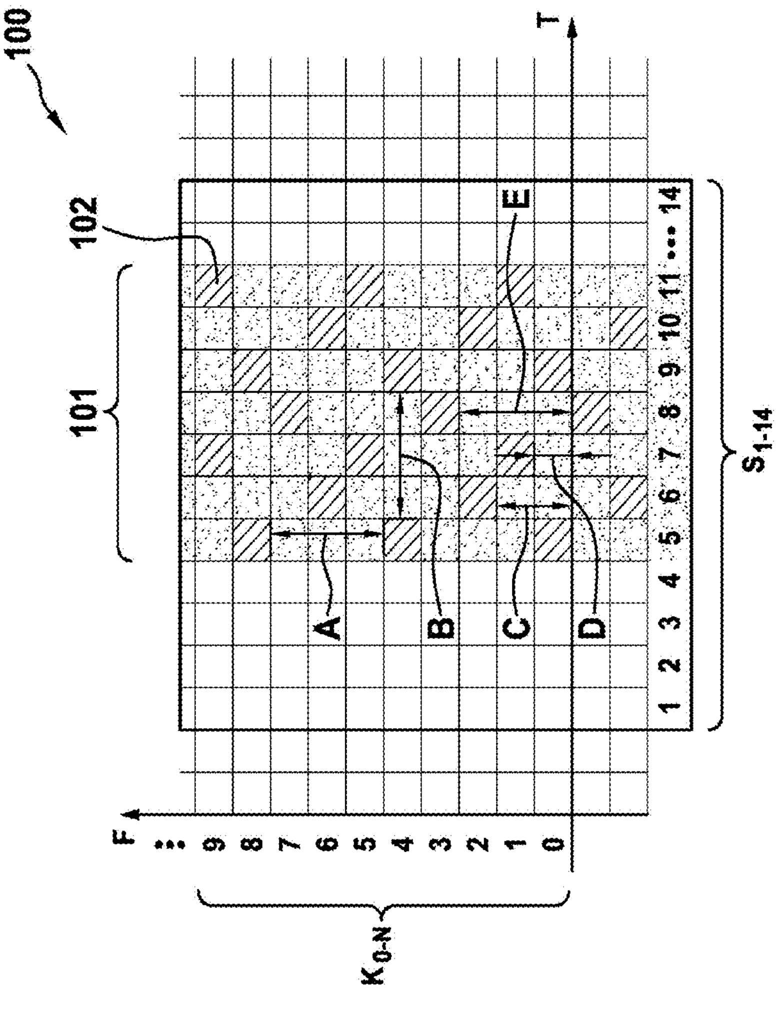
FIG. 11 schematically illustrates an example of an SPRS format definition.

FIG. 11 schematically illustrates an example of an SPRS format definition 100.

In FIG. 11, the position of resource elements comprised in an SPRS interlace pattern is defined according to time slots S1-14 frequency subcarrier offsets K. The interval 101 is the number of OFDM symbols used to transmit the sidelink position reference signal (SPRS). The resource element 102 is a comb element forming part of a position reference signal.

The initial position reference signal may, for example, be an SPRS comb as defined according to 3GPP Release 16, as in TS 138.211, section 7.4.1.7, which is hereby incorporated by reference, although this is not essential.

The offsetting of subcarriers within the SPRS comb defined by A, B, C, D, E.

According to an embodiment, the SPRS used in all options above has an interlaced structure. The interlaced structure covers a predetermined percentage of the unlicensed band F2. In an example, the SPRS may occupy 50%, 60%, 70%, 80%, 90%, 95% or 100% of the unlicensed band F2. In an embodiment, each radio node group UE-G1, UE-G2, UE-GK discussed above comprises a set of radio nodes multiplexing their SPRS over the predetermined occupied percentage of the unlicensed band F2 of nominal frequency (for example, 20 MHz). In an example, if all radio nodes in a radio node group UE-G1 are transmitting their SPRS, the whole band is interleaved with SPRS resource elements. Otherwise, only radio nodes UEs within the radio node group UE-G1 which succeed in the channel contention (LBT) for the unlicensed band F2 can share the SPRS portion of the unlicensed band F2 using an interlaced structure.

According to an embodiment of the first aspect, prior to transmitting the SPRS configuration 72, 83 to the second radio node UE2, performing channel contention LBT for control signalling in a bandwidth range at least partially comprised in an unlicensed radio band F2 using a listen before talk mechanism;

based on a positive result of the channel contention LBT for control signalling, accessing the channel for the duration of a channel on time associated with the channel contention; and wherein transmitting the SPRS configuration 72, 83 to the second radio node UE2 comprises transmitting the SPRS configuration 72, 83 in the bandwidth range of the unlicensed radio band (F2), during the channel on time associated with the channel contention for control signalling.

According to an embodiment, the SPRS configuration 72, 83 comprises an SPRS format definition 100 defining a proportion of resource elements of the unlicensed radio band F2 to be occupied by the at least one position reference signal transmitted by the first radio node UE1. The first radio node UE1 is configured to transmit, to the second radio node UE2, at least one position reference signal defined by the SPRS format definition via a plurality of subcarriers in a bandwidth range at least partially comprised in the unlicensed radio band F2.

According to an embodiment the SPRS format definition 100 has a plurality of subsets each corresponding to a plurality of further radio nodes, wherein the SPRS format definition is designed to fully occupy the unlicensed radio band F2, when all of the radio nodes in the plurality of further radio nodes obtain a positive result in a channel contention LBT operation.

According to an embodiment, the SPRS format definition 100 defines a plurality of subsets of SPRS patterns. Each SPRS pattern corresponds to a further radio node in the plurality of radio nodes UE-G1. The SPRS format definition by the first radio node UE1 defines an SPRS that is distributed across a predetermined proportion of the unlicensed radio band F2. A plurality of further radio nodes UE-G1 are configured to interleave their respective SPRS transmissions according to the SPRS format definition to obtain a positive result in a channel contention (LBT) operation.

According to a second aspect, there is provided a method 46 of a second radio node UE2, comprising:

transmitting 47, to a first radio node UE1, a sidelink position reference signal configuration defining at least one position reference signal to be transmitted from the first radio node UE1 to the second radio node UE2; and receiving 48 at least one sidelink position reference signal transmitted by the first radio node UE1 in a bandwidth range at least partially comprised in an unlicensed radio band F2, wherein the at least one sidelink position reference signal is defined according to the sidelink position reference signal configuration.

FIG. 4B schematically illustrates a method of a second radio node according to the second aspect.

According to an embodiment of the second aspect, the SPRS configuration 72, 83 is transmitted to the first radio node UE1 via a sidelink in a licensed radio band F1 of a radio access network.

According to an embodiment of the second aspect, the SPRS configuration 72, 83 is transmitted via at least one of a Physical Sidelink Shared Channel PSSCH, a Physical Sidelink Control Channel PSCCH, a Physical Downlink Shared Channel PDSCH, a Physical Downlink Control Channel PDCCH of the radio access network, or a Physical Sidelink Broadcast Channel PSBCH.

According to an embodiment of the second aspect, the SPRS configuration 72, 83 defines the synchronisation of the at least one position reference signal to at least one transmission opportunity of the side channel, and wherein the first radio node UE1 is configured to receive at least one position reference signal transmitted by the second radio node UE2 synchronised to the at least one transmission opportunity of the side channel as defined in the SPRS configuration 72, 83.

According to the above embodiment, a method of the second radio node UE2 is provided corresponding to the first option in which the data and/or control for arranging the SPRS are transmitted on a side link on the licensed band F1.

According to an embodiment of the second aspect, the SPRS configuration 72, 83 comprises a periodicity specifier 80 defining a plurality of further position reference signal transmission opportunities of the second radio node UE2, and/or a plurality of further radio nodes relative to an initial position reference signal transmission opportunity; and receiving a plurality of further position reference signals 76, 87 transmitted by a corresponding plurality of further radio nodes, wherein the plurality of further position reference signals occupy a plurality of subcarriers in a bandwidth range at least partially comprised in the unlicensed radio band F2.

According to an embodiment of the second aspect, the SPRS configuration.

72, 83 comprises a schedule of further position reference signal 76, 87 transmission opportunities of the second radio node UE2, and/or a plurality of further radio nodes.

According to an embodiment of the second aspect, the method further comprises calculating the position of at least the second radio node UE2 relative to the first radio node UE1 using the at least one position reference signal transmitted by the first radio node.

According to an embodiment of the second aspect, the position of at least the second radio node UE2 relative to the first radio node UE1 is calculated using the angle of departure or round-trip time.

According to an embodiment of the second aspect, the SPRS configuration 72, 83 defines an SPRS format definition 100 defining a proportion of resource elements of the unlicensed radio band F2 to be occupied by the at least one position reference signal transmitted by the second radio node UE2.

According to an embodiment of the second aspect, the SPRS format definition 100 defines a plurality of subsets of SPRS patterns. Each SPRS pattern corresponds to a further radio node in the plurality of radio nodes UE-G1. The SPRS format definition by the first radio node UE1 defines an SPRS that is distributed across a predetermined proportion of the unlicensed radio band F2. A plurality of further radio nodes UE-G1 are configured to interleave their respective SPRS transmissions according to the SPRS format definition to obtain a positive result in a channel contention (LBT) operation.

According to an embodiment of the second aspect, at least the first UE1 and second UE2 radio nodes are members of a 5G NR radio network.

According to an embodiment of the second aspect, the channel contention LBT returns a negative result in response to detecting the presence of a Wi-Fi, or Bluetooth transmission in the unlicensed radio band F2, or other interfering signals.

According to an embodiment of the second aspect, the licensed radio band F1 comprises a vehicle to everything (V2X) sub band of the 5G NR radio network.

Figure 12:
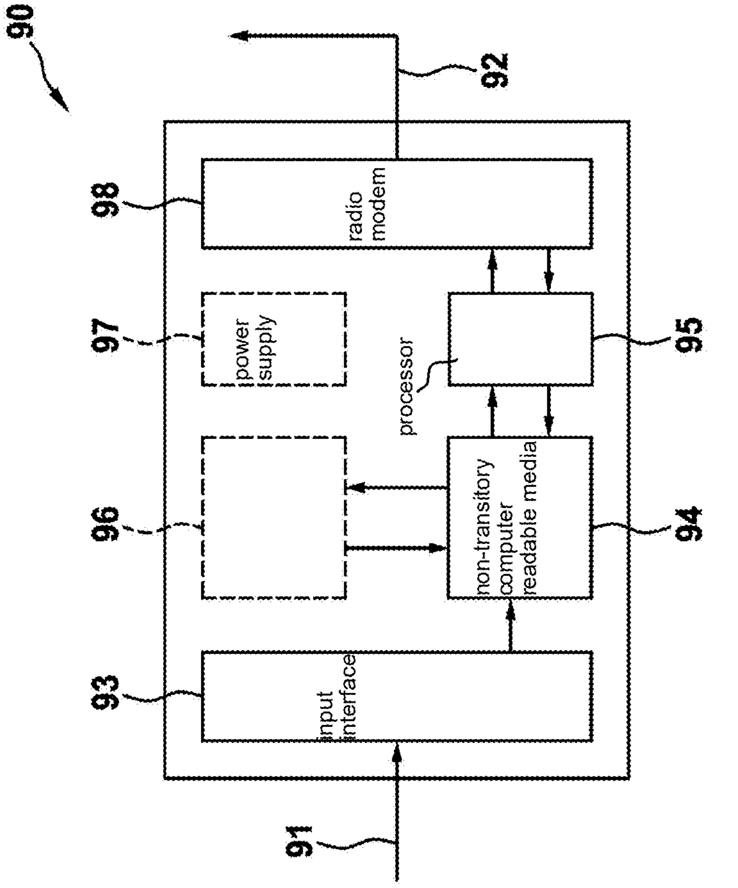
FIG. 12 schematically illustrates an example of a radio node according to the third and/or fourth aspects of the present invention.

FIG. 12 schematically illustrates an example of a first or a second radio node radio node according to the third and/or fourth aspects.

Apparatus Embodiments

According to a third aspect, there is provided a first radio node 90, comprising a radio modem 92, non-transitory computer readable media 94 comprising machine readable instructions, and a processor 95 configured to load and to execute the machine readable instructions to cause the first radio device to execute the method according to the first aspect or its embodiments, and thus to transmit a modified position reference signal to a second radio device via at least one side link channel. The first radio node UE1 is, in an example, configured to communicate using at least a vehicle to everything (V2X) sub band of the 5G NR radio network, and to transmit sidelink position reference signals on a portion of unlicensed band.

According to a fourth aspect, there is provided a second radio node, comprising a radio modem, non-transitory computer readable media comprising machine readable instructions, and a processor configured to load and to execute the machine readable instructions to cause the second radio device to execute the method according the second aspect or its embodiments. The second radio node UE1 is, in an example, configured to communicate using at least a vehicle to everything (V2X) sub band of the 5G NR radio network, and to transmit sidelink position reference signals on a portion of unlicensed band.

The first and/or second radio communication device 90 may comprise an input interface 93 configured to obtain input data 91, for example commands from a higher layer to perform positioning. The radio communication device 90 may comprise a power supply 97. The radio communication device may comprise an antenna 92 coupled to the radio modem 90. The first radio device may support device to device, internet of things, and V2X communications.

Radio Communication System

According to a fifth aspect, there is provided a system 8 comprising at least a first radio node UE1 according to the third aspect, and a second radio node UE2 according to the fourth aspect. The system 8 is, for example, configured to communicate using at least a vehicle to everything (V2X) sub band of the 5G NR radio network, and to transmit sidelink position reference signals on a portion of unlicensed band.

Computer Embodiments

According to a sixth aspect, there is provided a computer program element comprising machine readable instructions which, when loaded and executed by a processor, cause the processor to perform the method according to the first aspect.

According to a seventh aspect there is provided a computer program element comprising machine readable instructions which, when loaded and executed by a processor, cause the processor to perform the method according to the second aspect.

According to an eighth aspect, there is provided a non-transitory computer readable medium comprising the machine readable instructions of the sixth or seventh aspects.

According to a ninth aspect, there is provided a vehicle, comprising a radio communications node according to one of the third or fourth aspects.

The examples provided in the drawings and described in the foregoing written description are intended for providing an understanding of the principles of this specification. No limitation to the scope of the present invention is intended thereby. The present specification describes alterations and modifications to the illustrated examples. Only the preferred examples have been presented, and all changes, modifications and further applications to these within the scope of the specification are desired to be protected.

The invention claimed is:

1. A method of a first radio node, comprising the following steps:

transmitting, from the first radio node, a sidelink position reference signal (SPRS) configuration defining at least one position reference signal to be transmitted from a first radio node to the second radio node;

generating at least one position reference signal as defined by the SPRS configuration transmitted to the second radio node;

performing channel contention for the position reference signal transmission in a bandwidth range at least partially included in an unlicensed radio band, wherein the channel contention is performed using a listen before talk mechanism;

based on a positive result of the channel contention, accessing a channel for a duration of a channel on time; and transmitting the at least one position reference signal to the second radio node during the channel on time.

2. The method of claim 1, further comprising:

transmitting, to the second radio node, a periodicity specifier defining a plurality of further position reference signal transmission opportunities of the first radio node, and/or of a plurality of further radio nodes relative to an initial position reference signal transmission opportunity;

performing, at the first radio node, a plurality of further channel contention operations corresponding to each of the plurality of position reference signal transmission opportunities;

based on a positive result of at least one of the further channel contention operations, accessing the channel for the duration of the channel on time; and transmitting at least one further position reference signal to the second radio node during the channel on time as defined by the periodicity specifier.

3. The method of claim 1, further comprising:

transmitting, to the second radio node, a schedule of further position reference signal transmission opportunities of the first radio node and/or of a plurality of further radio nodes;

performing, at the first radio node, a plurality of further channel contention operations corresponding to each of the plurality of further position reference signal transmission opportunities;

based on a positive result of at least one of the further channel contention operation, accessing the channel for the duration of the channel on time; and transmitting at least one further position reference signal to the second radio node during the channel on time as defined in the schedule of further position reference signal transmission opportunities.

4. The method of claim 2, wherein the channel contention performed by the first radio node for the position reference signal transmission is a category 4 listen before talk operation, and/or wherein the channel contention performed by the first radio node for the further position reference signal transmission opportunities is a category 2 listen before talk operation.

5. The method according to claim 1, wherein the SPRS configuration transmitted by the first radio node is received in the bandwidth range of the unlicensed radio band, during the channel on time associated with channel contention for control signalling.

6. The method according to claim 1, further comprising:

obtaining, from the SPRS configuration, a synchronisation of the at least one position reference signal to at least one transmission opportunity of the side channel, and when the channel contention for the position reference signal transmission is positive during the at least one transmission opportunity of the side channel:

transmitting the at least one position reference signal to the second radio node during the channel on time.

7. The method according to claim 1, wherein the SPRS configuration includes an SPRS format definition defining a proportion of resource elements of the unlicensed radio band to be occupied by the at least one position reference signal transmitted by the first radio node; and transmitting, to the second radio node, at least one position reference signal defined by the SPRS format definition via a plurality of subcarriers in a bandwidth range at least partially includes in the unlicensed radio band.

8. The method according to claim 7, wherein the SPRS format definition defines a plurality of subsets of SPRS patterns, wherein each SPRS pattern corresponds to a further radio node in a plurality of further radio nodes, wherein the SPRS format definition transmitted by the first radio node defines an SPRS that is distributed across a predetermined proportion of the unlicensed radio band, wherein the plurality of further radio nodes are configured to interleave their respective SPRS transmissions according to the SPRS format definition to obtain a positive result in a channel contention operation.

9. The method according to claim 1, further comprising:

prior to transmitting the SPRS configuration to the second radio node, performing channel contention for control signalling in a bandwidth range at least partially included in the unlicensed radio band using a listen before talk mechanism;

based on a positive result of the channel contention for control signalling, accessing the channel for the duration of a channel on time associated with the channel contention; and wherein transmitting the SPRS configuration to the second radio node includes transmitting the SPRS configuration, in the bandwidth range of the unlicensed radio band, during the channel on time associated with the channel contention for control signalling.

10. A method of a second radio node, comprising the following steps:

transmitting, to a first radio node, a sidelink position reference signal (SPRS) configuration defining at least one position reference signal to be transmitted from the first radio node to the second radio node; and receiving at least one sidelink position reference signal transmitted by the first radio node in a bandwidth range at least partially included in an unlicensed radio band, wherein the at least one sidelink position reference signal is defined according to the SPRS configuration.

11. The method according to claim 10, wherein the SPRS configuration defines a synchronisation of the at least one position reference signal to at least one transmission opportunity of the side channel, and wherein the first radio node is configured to receive at least one position reference signal transmitted by the second radio node synchronised to the at least one transmission opportunity of the side channel as defined in the SPRS configuration.

12. The method according to one of claim 10, wherein the SPRS configuration includes a periodicity specifier defining a plurality of further position reference signal transmission opportunities of the second radio node and/or of a plurality of further radio nodes relative to an initial position reference signal transmission opportunity; and receiving a plurality of further position reference signals transmitted by a corresponding plurality of further radio nodes, wherein the plurality of further position reference signals occupy a plurality of subcarriers in a bandwidth range at least partially comprised in the unlicensed radio band.

13. The method according to claim 10, wherein the SPRS configuration includes a schedule of further position reference signal transmission opportunities of the second radio node and/or of a plurality of further radio nodes.

14. The method according to claim 10, wherein the SPRS configuration includes an SPRS format definition defining a proportion of resource elements of the unlicensed radio band to be occupied by the at least one position reference signal transmitted by the second radio node.

15. The method according to claim 14, wherein the SPRS format definition defines a plurality of subsets of SPRS patterns, wherein each SPRS pattern corresponds to a further radio node in a plurality of further radio nodes, wherein the SPRS format definition from the first radio node defines an SPRS that is distributed across a predetermined proportion of the unlicensed radio band, wherein the plurality of further radio nodes are configured to interleave their respective SPRS transmissions according to the SPRS format definition to obtain a positive result in a channel contention operation.

16. A first radio node, comprising:

a radio modem;

non-transitory computer readable media including machine readable instructions; and a processor configured to load and to execute the machine readable instructions to cause the first radio device to perform the following steps:

transmitting, from the first radio node, a sidelink position reference signal (SPRS) configuration defining at least one position reference signal to be transmitted from a first radio node to the second radio node;

generating at least one position reference signal as defined by the SPRS configuration transmitted to the second radio node;

performing channel contention for the position reference signal transmission in a bandwidth range at least partially included in an unlicensed radio band, wherein the channel contention is performed using a listen before talk mechanism;

based on a positive result of the channel contention, accessing a channel for a duration of a channel on time; and transmitting the at least one position reference signal to the second radio node during the channel on time.

17. A second radio node, comprising:

a radio modem;

non-transitory computer readable media including machine readable instructions;

a processor configured to load and to execute the machine readable instructions to cause the second radio device to perform the following steps:

transmitting, to a first radio node, a sidelink position reference signal (SPRS) configuration defining at least one position reference signal to be transmitted from the first radio node to the second radio node; and receiving at least one sidelink position reference signal transmitted by the first radio node in a bandwidth range at least partially included in an unlicensed radio band, wherein the at least one sidelink position reference signal is defined according to the SPRS configuration.

* * * * *